United States Patent
Soltanmohammadi et al.

(10) Patent No.: US 11,550,309 B2
(45) Date of Patent: Jan. 10, 2023

(54) UNSUPERVISED DEFECT SEGMENTATION

(71) Applicant: KLA-Tencor Corporation, Milpitas, CA (US)

(72) Inventors: Erfan Soltanmohammadi, Felton, CA (US); Ashwin Ramakrishnan, San Jose, CA (US); Mohit Jani, Milpitas, CA (US)

(73) Assignee: KLA Corporation, Milpitas, CA (US)

( * ) Notice: Subject to any disclaimer, the term of this patent is extended or adjusted under 35 U.S.C. 154(b) by 957 days.

(21) Appl. No.: 16/242,844

(22) Filed: Jan. 8, 2019

(65) Prior Publication Data

US 2020/0218241 A1    Jul. 9, 2020

(51) Int. Cl.
*G05B 19/418*    (2006.01)

(52) U.S. Cl.
CPC .......... *G05B 19/41875* (2013.01); *G05B 2219/33034* (2013.01); *G05B 2219/37224* (2013.01); *G05B 2219/45031* (2013.01)

(58) Field of Classification Search
CPC .... G05B 19/41875; G05B 2219/33034; G05B 2219/37224; G05B 2219/45031
See application file for complete search history.

(56) References Cited

U.S. PATENT DOCUMENTS

| | | | |
|---|---|---|---|
| 5,544,256 A | | 8/1996 | Brecher et al. |
| 6,456,899 B1 | | 9/2002 | Gleason et al. |
| 2005/0021280 A1 | | 1/2005 | Woods et al. |
| 2013/0279796 A1* | 10/2013 | Kaizerman | .......... G06K 9/6256 382/149 |
| 2015/0227654 A1* | 8/2015 | Hunsche | ................. H01L 22/20 716/54 |
| 2017/0082555 A1 | | 3/2017 | He et al. |
| 2018/0157933 A1* | 6/2018 | Brauer | ................. G06T 7/0004 |
| 2019/0079022 A1* | 3/2019 | Shabtay | ............. G01N 21/8803 |

FOREIGN PATENT DOCUMENTS

KR        20170088849 A        8/2017

OTHER PUBLICATIONS

KLA eyes changing process technology with new inspection tools; published on Jan. 20, 2012 in EE Times by Dylan McGrath; 3 pages; printed from the Internet on May 7, 2022.*
International Search Report dated Apr. 28, 2020 for PCT/US2019/069014.

* cited by examiner

*Primary Examiner* — Ronald D Hartman, Jr.
(74) *Attorney, Agent, or Firm* — Suiter Swantz pc llo

(57) ABSTRACT

An inspection system may receive inspection datasets from a defect inspection system associated with inspection of one or more samples, where an inspection dataset of the plurality of inspection datasets associated with a defect includes values of two or more signal attributes and values of one or more context attributes. An inspection system may further label each of the inspection datasets with a class label based on respective positions of each of the inspection datasets in a signal space defined by the two or more signal attributes, where each class label corresponds to a region of the signal space. An inspection system may further segment the inspection datasets into two or more defect groups by training a classifier with the values of the context attributes and corresponding class labels for the inspection datasets, where the two or more defect groups are identified based on the trained classifier.

36 Claims, 11 Drawing Sheets

FIG. 4B

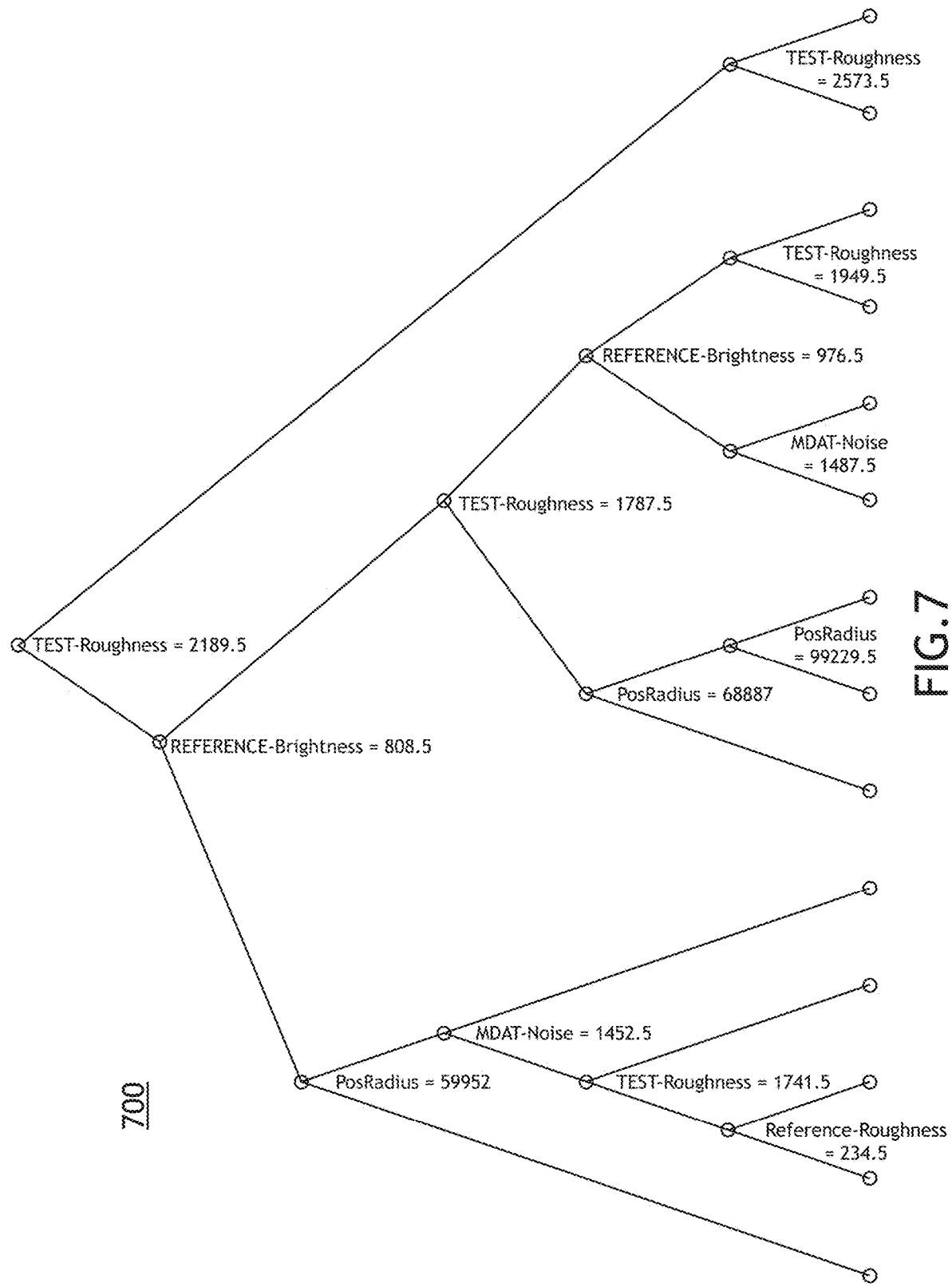

UNSUPERVISED DEFECT SEGMENTATION

TECHNICAL FIELD

The present disclosure relates generally to defect inspection and, more particularly, to unsupervised segmentation of defects.

BACKGROUND

Defect inspection systems identify and/or classify defects on semiconductor wafers. A given semiconductor wafer may include hundreds of chips, each chip containing thousands of components of interest, and each component of interest may have millions of instances on a given layer of a chip. Inspection systems may thus generate vast numbers of data points on a given wafer. As a result, properly segmenting these datapoints into different groups to efficiently generate useful information is an ongoing challenge for defect classification. For example, defect segmentation may facilitate various aspects of a fabrication process including, but not limited to, defect discovery, defect classification, nuisance filtering, or selecting optics to achieve a desired level of performance.

Defect segmentation is typically performed as a post-inspection step and is often carried out with the assistance of a human expert (e.g., supervised segmentation). However, the demand for ever-shrinking devices leads to increased demands on inspection systems. For example, as design rules shrink, differences between the noise floors associated with defects of interest relative to nuisance inspection datapoints may also shrink. As a result, segmentation based solely on attributes of a signal generated at a defect site or context attributes may be insufficient or ineffective. Further, the number of attributes that may be used for defect segmentation may make supervised segmentation inefficient or impractical. Therefore, it would be desirable to provide a system and method for curing shortcomings such as those identified above.

SUMMARY

An inspection system is disclosed in accordance with one or more illustrative embodiments of the present disclosure. In one illustrative embodiment, the system includes a controller with one or more processors. In another illustrative embodiment, the controller receives inspection datasets from a defect inspection system associated with inspection of one or more samples, where an inspection dataset associated with a defect includes values of two or more signal attributes and values of one or more context attributes. In another illustrative embodiment, a signal attribute is representative of a signal generated by the defect inspection system in response to a defect. In another illustrative embodiment, a context attribute of the one or more context attributes is representative of one or more additional characteristics of the defect. In another illustrative embodiment, the controller labels each of the inspection datasets with a class label based on respective positions of each of the inspection datasets in a signal space defined by the two or more signal attributes, where each class label corresponds to a region of the signal space. In another illustrative embodiment, the controller segments the plurality of inspection datasets into two or more defect groups by training a classifier with the values of the one or more context attributes and corresponding class labels for the inspection datasets, where the two or more defect groups are identified based on the trained classifier.

An inspection system is disclosed in accordance with one or more illustrative embodiments of the present disclosure. In one illustrative embodiment, the system includes a defect inspection system. In another illustrative embodiment, the defect inspection system includes an illumination source to generate one or more illumination beams. In another illustrative embodiment, the defect inspection system includes a detector to capture radiation emanating from a sample in response to the one or more illumination beams. In another illustrative embodiment, the system includes a controller communicatively coupled to the detector. In another illustrative embodiment, the controller receives inspection datasets from a defect inspection system associated with inspection of one or more samples, where an inspection dataset associated with a defect includes values of two or more signal attributes and values of one or more context attributes. In another illustrative embodiment, a signal attribute is representative of a signal generated by the defect inspection system in response to a defect. In another illustrative embodiment, a context attribute is representative of one or more additional characteristics of the defect. In another illustrative embodiment, the controller labels each of the inspection datasets with a class label based on respective positions of each of the inspection datasets in a signal space defined by the two or more signal attributes, where each class label corresponds to a region of the signal space. In another illustrative embodiment, the controller segments the inspection datasets into two or more defect groups by training a classifier with the values of the one or more context attributes and corresponding class labels for the inspection datasets, where the two or more defect groups are identified based on the trained classifier.

A method for segmenting metrology defects is disclosed in accordance with one or more illustrative embodiments of the present disclosure. In one illustrative embodiment, the method includes receiving inspection datasets from a defect inspection system associated with inspection of one or more samples, where an inspection dataset associated with a defect includes values of two or more signal attributes and values of one or more context attributes. In another illustrative embodiment, a signal attribute is representative of a signal generated by the defect inspection system in response to a defect. In another illustrative embodiment, a context attribute is representative of one or more additional characteristics of the defect. In another illustrative embodiment, the method includes labeling each of the inspection datasets with a class label based on respective positions of each of the inspection datasets in a signal space defined by the two or more signal attributes, where each class label corresponds to a region of the signal space. In another illustrative embodiment, the method includes segmenting the inspection datasets into two or more defect groups by training a classifier with the values of the one or more context attributes and corresponding class labels for the inspection datasets, where the two or more defect groups are identified based on the trained classifier.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 4B is a plot of a signal space divided into a set of non-overlapping polygons, each with a different class label, in accordance with one or more embodiments of the present disclosure.

FIG. 7 is a decision tree associated with inspection data including 11 context attributes, only 6 of which are used to segment the inspection data, in accordance with one or more embodiments of the present disclosure.

DETAILED DESCRIPTION

Figure 1A:
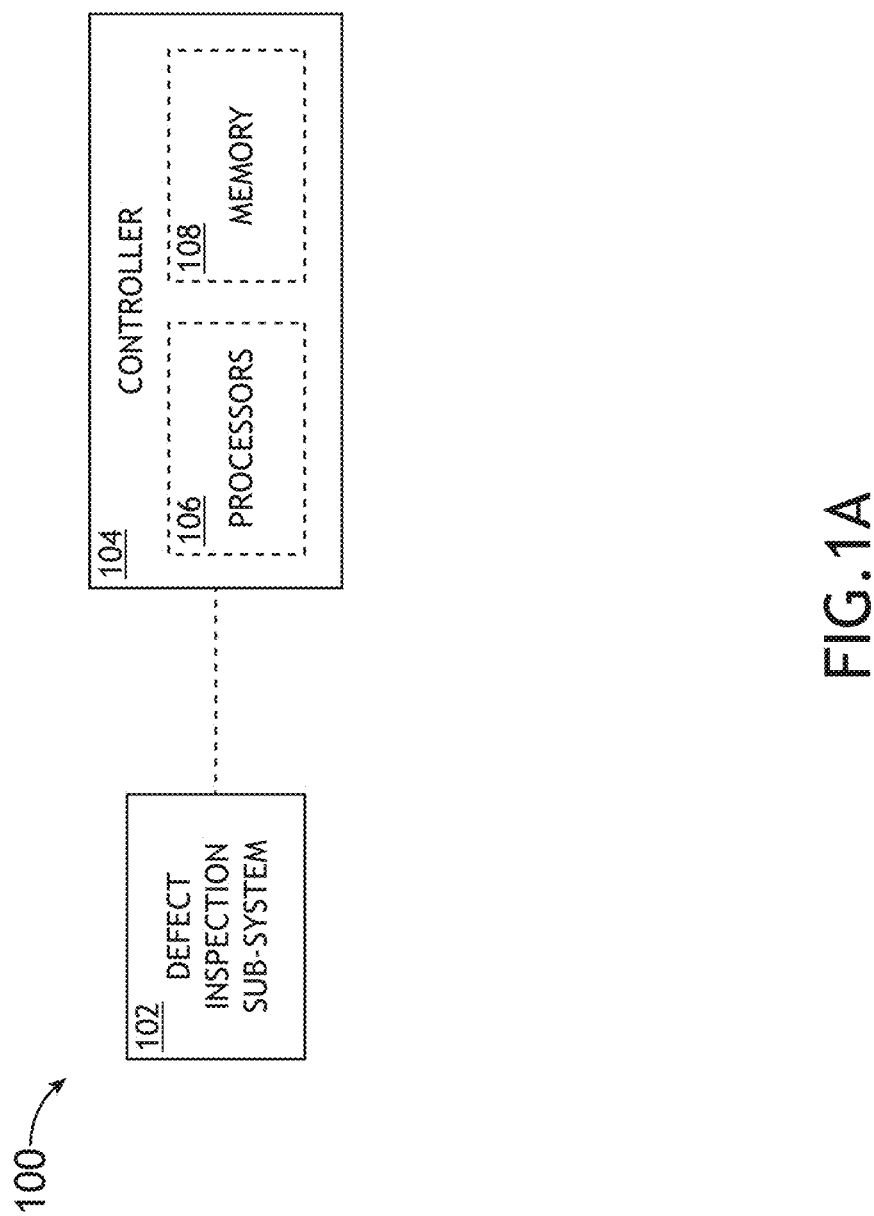
FIG. 1A is a conceptual view illustrating an inspection system, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for unsupervised and automated segmentation of defects. In this regard, defect segmentation may occur without the assistance of a user (e.g., a human expert) or the use of training data. It is recognized that unsupervised defect detection may overcome limitations associated with human intervention during segmentation, may facilitate consistent segmentation, and may lead to tool entitlement.

It is recognized herein that defect inspection systems may generate an inspection dataset associated with each defect (or potential defect) on a sample. This inspection dataset may include a variety of inspection datapoints, each of which may be suitable for use in a defect segmentation technique. For example, an inspection dataset may include one or more signal attributes, or attributes of a signal measured by a defect inspection system associated with a defect (e.g., associated with a location on a sample corresponding to a defect) such as, but not limited to, energy, magnitude, or polarization of the measured signal. Signal attributes may further include parameters associated with a defect detection algorithm such as, but not limited to, spotlikeness or a multi-die automatic thresholding (MDAT) offset value. By way of another example, an inspection dataset may include one or more context attributes associated with the defect. For instance, a context attribute may include information associated with a relationship between a defect and surrounding areas such as, but not limited to, a relative brightness of a defect with respect to surrounding areas (e.g., polarity), relative or absolute location of the defect on the sample, proximity of the defect to features or areas of interest, brightness of a reference image used to detect the defect, or roughness associated with a reference image used to detect the defect. Context attributes may further include parameters associated with a defect detection algorithm such as, but not limited to, a MDAT gray level or a MDAT noise level.

Embodiments of the present disclosure are directed to performing unsupervised segmentation by structuring inspection data as a supervised classification problem, training a supervised classifier (e.g., a supervised learning technique), and segmenting the inspection data based on patterns or structures identified during the training. In this regard, any of a broad range of supervised learning techniques may be used to identify different defect groups based on multi-dimensional patterns between signal and context attributes of inspection data. As a result, the supervised learning techniques may be exploited to provide unsupervised defect segmentation.

It is recognized herein that inspection data may be segmented based on signal attributes. For example, inspection data may be mapped into a multi-dimensional signal space defined by two or more signal attributes and segmented into different defect groups based on location in the signal space. For instance, a clustering algorithm may be used to identify clusters of inspection datasets in the signal space to identify groups of defects having similar signal attributes. However, it may be the case that segmentation based solely on signal attributes may not be sufficient to identify all desired defect groups (e.g., groups of defects having different noise characteristics, degrees of impact on performance, or the like). For example, multiple defect types may have overlapping distributions in the signal space. Further, as fabrication technology moves towards smaller design rules, the signal to noise ratios of multiple types of defects may become increasingly similar such that identification of particular DOIs from other signals (e.g., nuisance signals) may become increasingly challenging.

It is further recognized that inspection data may be segmented based on context attributes. For example, inspection data may be plotted as a function of one or more context attributes in histogram plots and segmented based on dips in the histogram plots. However, defect segmentation based solely on context attributes may similarly be insufficient to distinguish desired defect groups.

Additional embodiments of the present disclosure are directed to segmenting inspection data based on both signal and context attributes. In some embodiments, inspection data are labeled with class labels (e.g., class labels suitable for use in supervised learning algorithms) based on locations in the signal space. For example, the multi-dimensional signal space may be divided into a set of nonoverlapping regions, where each region may be assigned a unique class label. Further embodiments of the present disclosure are directed to training a supervised classifier based on the context attributes and the corresponding class labels and segmenting the inspection data into defect groups based on the trained classifier. The classifier may thus be trained to correlate patterns in context attributes of inspection data to specific locations within the signal space associated with the assigned class labels. These patterns in the context attributes may then be used to segment the inspection data into defect groups that correspond to separable regions in the signal space. In this regard, the trained classifier may utilize the context attributes to identify separate defect groups that may have overlapping distributions in the signal space. As a result, highly granular defect groups may be identified, which may facilitate defect discovery, defect classification, nuisance filtering, optics selection, and the like.

Further, reducing the multi-dimensional signal space to a single dimension (the set of class labels) enables the use of any supervised learning technique such as, but not limited to, a decision tree technique, a nearest neighbor technique, a regression technique, a Bayesian technique, a support vector machine technique, a similarity technique, or a neural network technique.

Defect segmentation as disclosed herein may be carried out by any combination of systems. For example, defect segmentation may be performed by an inspection system suitable for inspecting one or more samples for defects. By way of another example, defect segmentation may be carried out by one or more dedicated controllers communicatively coupled to at least an inspection system. In this regard, at least a portion of the defect segmentation operations may be offloaded from the inspection tool.

Additional embodiments of the present disclosure are directed to providing inspection data including defect segmentation information as feedback or feedforward data for any process step including, but not limited to, defect discovery, defect classification, nuisance filtering, recipe control, or optics selection. For example, inspection data including defect segmentation information on one or more samples may be utilized to generate an inspection recipe (e.g., including definitions of inspection locations, setup parameters for inspection, or the like) for one or more additional samples. By way of another example, inspection data including defect segmentation information on samples within a lot may be provided as feedback data for process steps on additional samples within the lot or additional lots. By way of a further example, inspection data including defect segmentation information on samples within a lot may be provided as feedforward data for subsequent process steps associated with the same samples in the lot.

FIG. 1A is a conceptual view illustrating an inspection system 100, in accordance with one or more embodiments of the present disclosure. In one embodiment, the inspection system 100 includes a defect inspection sub-system 102. For example, the defect inspection sub-system 102 may generate an image of one or more portions of a sample. In another embodiment, the inspection system 100 includes a controller 104. In another embodiment, the controller 104 includes one or more processors 106 configured to execute program instructions maintained on a memory device 108 (e.g., memory). In this regard, the one or more processors 106 of controller 104 may execute any of the various process steps described throughout the present disclosure. For example, the controller 104 may, but is not limited to, receive defect inspection data associated with any number of samples, divide a signal space defined by any number of signal attributes within the inspection data into different regions, assign inspection data class labels based on which region of signal space they map to, train a classifier (e.g., a supervised classifier, a supervised learning technique, or the like) to correlate context attributes to locations in the signal space based on the class labels, or identify defect groups based on the trained classifier.

The one or more processors 106 of the controller 104 may include any processing element known in the art. In this sense, the one or more processors 106 may include any microprocessor-type device configured to execute algorithms and/or instructions. In one embodiment, the one or more processors 106 may consist of a desktop computer, mainframe computer system, workstation, image computer, parallel processor, or any other computer system (e.g., networked computer) configured to execute a program configured to operate the inspection system 100, as described throughout the present disclosure. It is further recognized that the term "processor" may be broadly defined to encompass any device having one or more processing elements, which execute program instructions from a non-transitory memory device 108. Further, the steps described throughout the present disclosure may be carried out by a single controller 104 or, alternatively, multiple controllers. Additionally, the controller 104 may include one or more controllers housed in a common housing or within multiple housings. In this way, any controller or combination of controllers may be separately packaged as a module suitable for integration into inspection system 100. Further, the controller 104 may analyze data received from a detector 126 and feed the data to additional components within the defect inspection sub-system 102 or external to the inspection system 100.

The memory device 108 may include any storage medium known in the art suitable for storing program instructions executable by the associated one or more processors 106. For example, the memory device 108 may include a non-transitory memory medium. By way of another example, the memory device 108 may include, but is not limited to, a read-only memory, a random access memory, a magnetic or optical memory device (e.g., disk), a magnetic tape, a solid state drive, and the like. It is further noted that memory device 108 may be housed in a common controller housing with the one or more processors 106. In one embodiment, the memory device 108 may be located remotely with respect to the physical location of the one or more processors 106 and controller 104. For instance, the one or more processors 106 of controller 104 may access a remote memory (e.g., server), accessible through a network (e.g., internet, intranet and the like). Therefore, the above description should not be interpreted as a limitation on the present invention but merely an illustration.

Figure 1B:
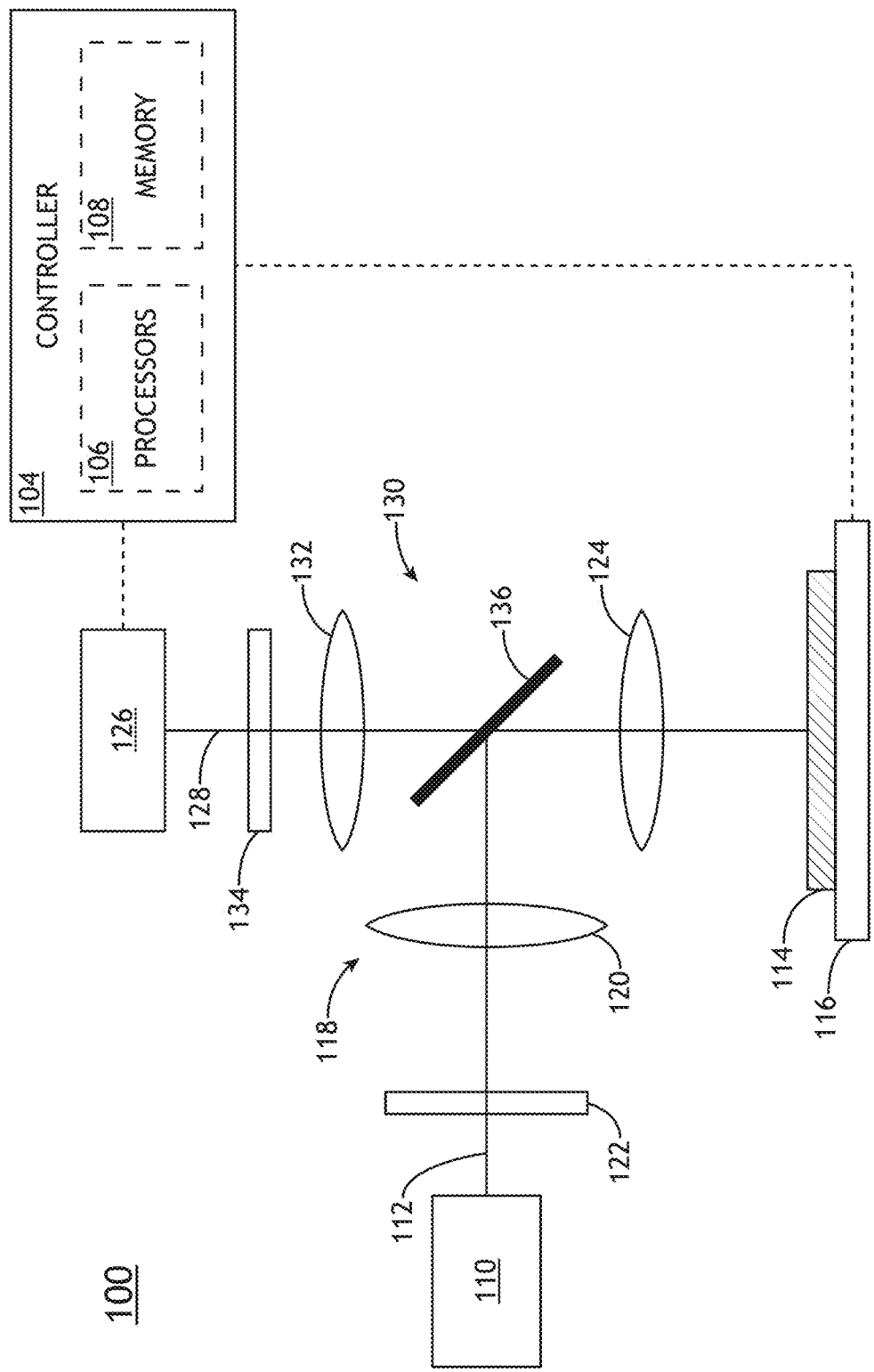
FIG. 1B is a conceptual view illustrating an optical defect inspection system, in accordance with one or more embodiments of the present disclosure.
Figure 1C:
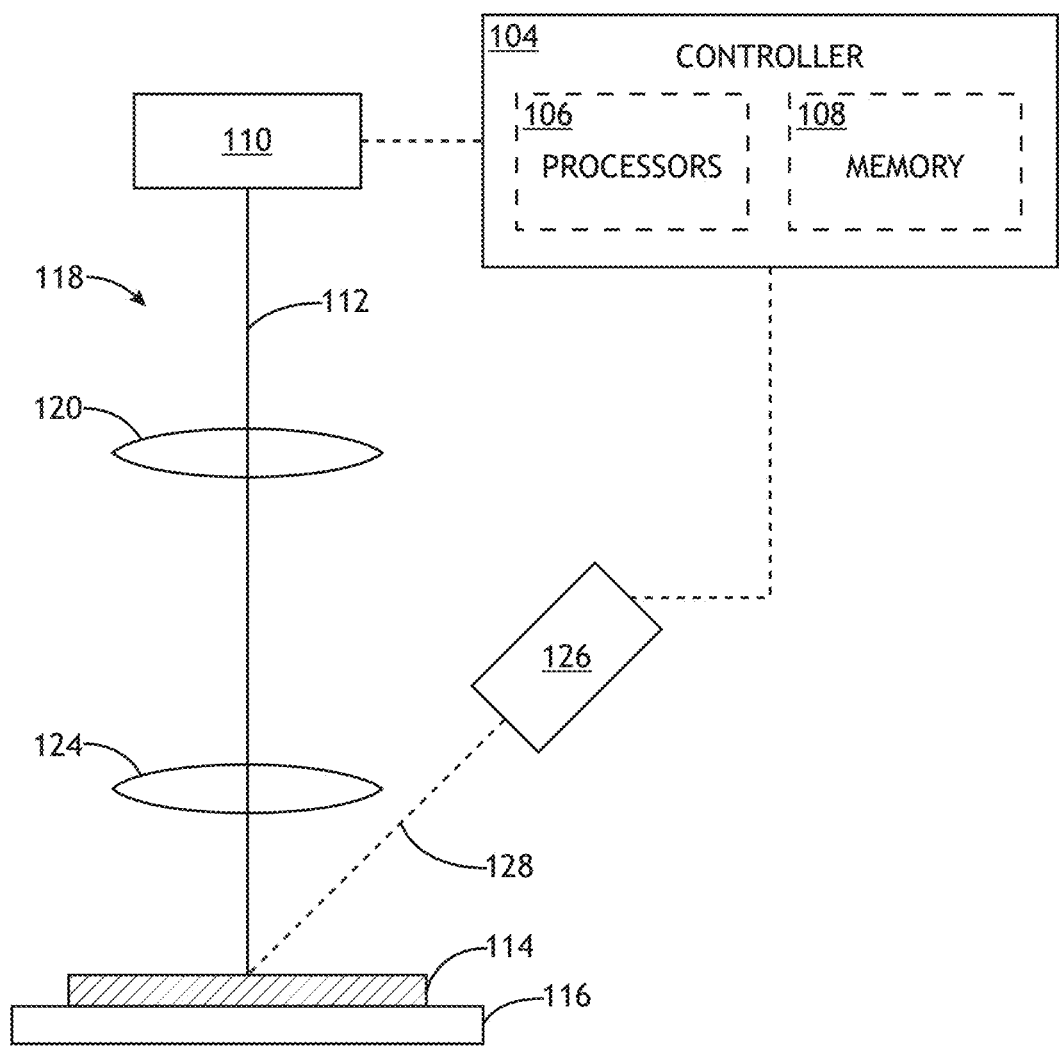
FIG. 1C is a conceptual view of a defect inspection system configured as a particle beam metrology tool, in accordance with one or more embodiments of the present disclosure.

Referring now to FIGS. 1B and 1C, various components of the inspection system 100 are described in greater detail.

The defect inspection sub-system 102 may include any type of metrology device known in the art. For example, the defect inspection sub-system 102 may illuminate a sample with an illumination beam and may further collect radiation emanating from the sample in response to the illumination beam. The illumination beam may include any type of illumination beam suitable for probing a sample such as, but not limited to, a light beam (e.g., photons), an electron beam, or an ion beam. Further, the radiation emanating from the sample may include photons, electrons, ions, neutral particles, or the like. Accordingly, the defect inspection sub-system 102 may include an optical metrology tool, an e-beam metrology tool, a scanning electron microscope (SEM), an ion-beam metrology tool, or the like.

The defect inspection sub-system 102 may further operate in either a direct imaging mode or a scanning imaging mode. For example, the defect inspection sub-system 102 operating in a direct imaging mode may illuminate a portion of the sample larger than the system resolution and capture an image of the illuminated portion of the sample on a detector. The captured image may be any type of image known in the art such as, but not limited to, a brightfield image, a darkfield image, a phase-contrast image, or the like. Further, captured images may be stitched together (e.g., by the defect inspection sub-system 102, by the controller 104, or the like) to form a composite image of the sample. By way of another example, the defect inspection sub-system 102 operating in a scanning mode may scan a focused beam across the sample and capture radiation and/or particles emanating from the sample on one or more detectors at one or more measurement angles. The focused beam may be scanned across the sample by modifying the beam path (e.g., using a galvo mirror, a piezo-electric mirror, or the like) and/or by translating the sample through a focal volume of the focused beam. The captured radiation may then be stitched together (e.g., by the defect inspection sub-system 102, by the controller 104, or the like) to form a composite image of the sample.

FIG. 1B is a conceptual view illustrating an optical defect inspection sub-system 102, in accordance with one or more embodiments of the present disclosure. In one embodiment, the defect inspection sub-system 102 includes an illumination source 110 configured to generate an illumination beam 112. The illumination beam 112 may include one or more selected wavelengths of light including, but not limited to, ultraviolet (UV) radiation, visible radiation, or infrared (IR) radiation.

The illumination source 110 may be any type of illumination source known in the art suitable for generating an optical illumination beam 112. In one embodiment, the illumination source 110 includes a broadband plasma (BBP) illumination source. In this regard, the illumination beam 112 may include radiation emitted by a plasma. For example, a BBP illumination source 110 may include, but is not required to include, one or more pump sources (e.g., one or more lasers) configured to focus pump light into a volume of a gas, causing energy to be absorbed by the gas in order to generate or sustain a plasma suitable for emitting radiation. Further, at least a portion of the plasma radiation may be utilized as the illumination beam 112. In another embodiment, the illumination source 110 may include one or more lasers. For instance, the illumination source 110 may include any laser system known in the art capable of emitting radiation in the infrared, visible, or ultraviolet portions of the electromagnetic spectrum.

In another embodiment, the illumination source 110 directs the illumination beam 112 to a sample 114 disposed on a sample stage 116 via an illumination pathway 118. The illumination pathway 118 may include one or more lenses 120 or additional optical components 122 suitable for modifying and/or conditioning the illumination beam 112. For example, the one or more optical components 122 may include, but are not limited to, one or more polarizers, one or more filters, one or more beam splitters, one or more diffusers, one or more homogenizers, one or more apodizers, or one or more beam shapers. In another embodiment, the defect inspection sub-system 102 includes an objective lens 124 to focus the illumination beam 112 onto the sample 114.

In another embodiment, the defect inspection sub-system 102 includes a detector 126 configured to capture radiation emanating from the sample 114 (e.g., sample radiation 128) through a collection pathway 130. For example, a detector 126 may receive an image of the sample 114 provided by elements in the collection pathway 130 (e.g., the objective lens 124, one or more collection lenses 132, or the like). The collection pathway 130 may further include any number of collection optical elements 134 to direct and/or modify illumination collected by the objective lens 124 including, but not limited to, one or more filters, one or more polarizers, one or more apodizers, or one or more beam blocks.

The detector 126 may include any type of optical detector known in the art suitable for measuring radiation received from the sample 114. For example, a detector 126 may include, but is not limited to, a CCD detector, a TDI detector, a photomultiplier tube (PMT), an avalanche photodiode (APD), or the like. In another embodiment, a detector 126 may include a spectroscopic detector suitable for identifying wavelengths of radiation emanating from the sample 114. In another embodiment, the defect inspection sub-system 102 may include multiple detectors 126 (e.g., associated with multiple beam paths generated by one or more beamsplitters to facilitate multiple metrology measurements by the defect inspection sub-system 102).

In one embodiment, as illustrated in FIG. 1B, the defect inspection sub-system 102 may include a beamsplitter 136 oriented such that the objective lens 124 may simultaneously direct the illumination beam 112 to the sample 114 and collect radiation emanating from the sample 114. In another embodiment, the angle of incidence of the illumination beam 112 on the sample 114 is adjustable. For example, the path of the illumination beam 112 through the beamsplitter 136 and the objective lens 124 may be adjusted to control the angle of incidence of the illumination beam 112 on the sample 114.

In another embodiment, the defect inspection sub-system 102 is communicatively coupled to the controller 104 of inspection system 100. In this regard, the controller 104 may be configured to receive data including, but not limited to, metrology images.

FIG. 1C is a conceptual view of a defect inspection sub-system 102 configured as a particle beam metrology tool, in accordance with one or more embodiments of the present disclosure. In one embodiment, the illumination source 110 includes a particle source (e.g., an electron beam source, an ion beam source, or the like) such that the illumination beam 112 includes a particle beam (e.g., an electron beam, a particle beam, or the like). The illumination source 110 may include any particle source known in the art suitable for generating an illumination beam 112. For example, the illumination source 110 may include, but is not limited to, an electron gun or an ion gun. In another embodiment, the illumination source 110 is configured to provide a particle beam with a tunable energy. For example, an illumination source 110 including an electron source may, but is not limited to, provide an accelerating voltage in the range of 0.1 kV to 30 kV. As another example, an illumination source 110 including an ion source may, but is not required to, provide an ion beam with an energy in the range of 1 to 50 keV.

In another embodiment, the illumination pathway 118 includes one or more particle focusing elements (e.g., lenses 120, or the like). For example, the one or more particle focusing elements may include, but are not limited to, a single particle focusing element or one or more particle focusing elements forming a compound system. In another embodiment, the one or more particle focusing elements include objective lens 124 configured to direct the illumination beam 112 to the sample 114. Further, the one or more particle focusing elements may include any type of electron lenses known in the art including, but not limited to, electrostatic, magnetic, uni-potential, or double-potential lenses. It is noted herein that the description of an imaging metrology tool as depicted in FIG. 1C and the associated descriptions above are provided solely for illustrative purposes and should not be interpreted as limiting. For example, the defect inspection sub-system 102 may include any excitation source known in the art suitable for generating metrology data on a sample 114. In another embodiment, the defect inspection sub-system 102 includes two or more particle beam sources (e.g., electron beam sources or ion beam sources) for the generation of two or more particle beams. In a further embodiment, the defect inspection sub-system 102 may include one or more components (e.g., one or more electrodes) configured to apply one or more voltages to one or more locations of the sample 114. In this regard, the defect inspection sub-system 102 may generate voltage contrast imaging data.

In another embodiment, the defect inspection sub-system 102 includes one or more particle detectors 126 to image or otherwise detect particles emanating from the sample 114. In one embodiment, the detector 126 includes an electron collector (e.g., a secondary electron collector, a backscattered electron detector, or the like). In another embodiment, the detector 126 includes a photon detector (e.g., a photodetector, an x-ray detector, a scintillating element coupled to photomultiplier tube (PMT) detector, or the like) for detecting electrons and/or photons from the sample surface.

Figure 2:
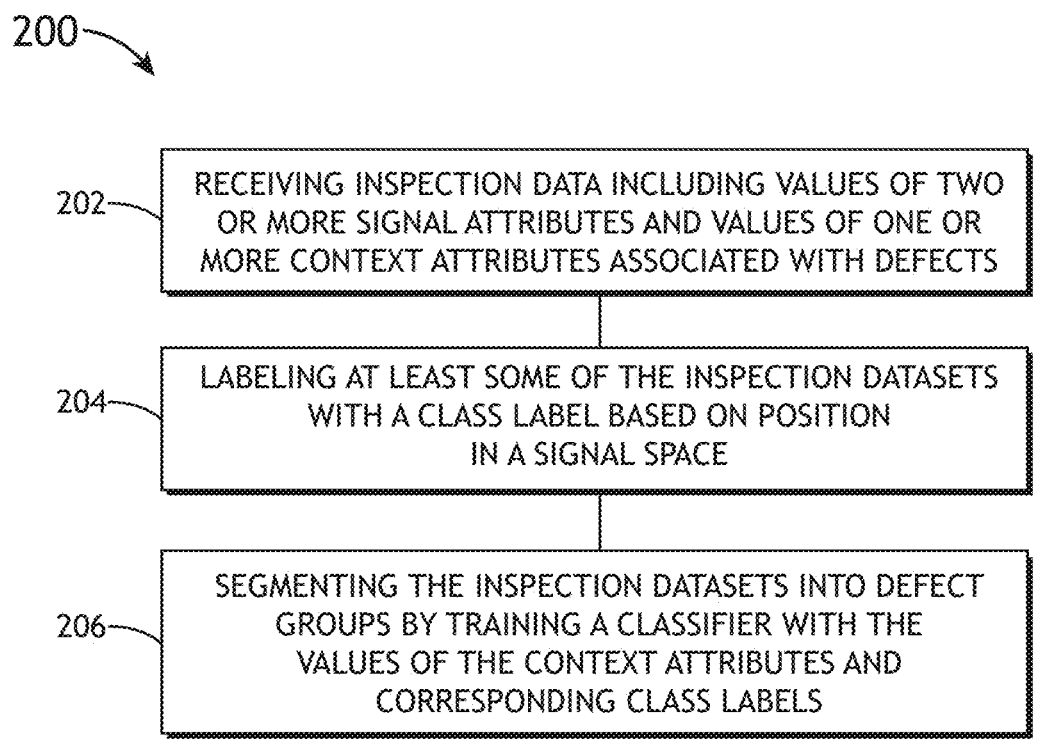
FIG. 2 is a flow diagram illustrating steps performed in a method for segmenting defects, in accordance with one or more embodiments of the present disclosure.

FIG. 2 is a flow diagram illustrating steps performed in a method 200 for segmenting defects, in accordance with one or more embodiments of the present disclosure. Applicant notes that the embodiments and enabling technologies described previously herein in the context of the inspection system 100 should be interpreted to extend to method 200. It is further noted, however, that the method 200 is not limited to the architecture of the inspection system 100.

In one embodiment, the method 200 includes a step 202 of receiving inspection data including values of two or more signal attributes and values of one or more context attributes associated with defects. For example, inspection data may be received from a defect inspection system (e.g., the inspection system 100, or the like) based on inspection of one or more samples. Further, the inspection data may include an inspection dataset associated with each identified defect, where each inspection dataset includes corresponding values of the signal and context attributes associated with the defect.

A signal attribute may include a measurable characteristic associated with a signal generated by a defect inspection system such as, but not limited to, the inspection system 100 illustrated in FIG. 1B or 1C, in response to a defect. For example, considering the inspection system 100, signal attributes may include, but are not limited to, measurable characteristics associated with the sample radiation 128 from the sample 114 in response to the illumination beam 112 such as, but not limited to, an energy, magnitude, wavelength, or polarization of the sample radiation 128. By way of another example, a signal attribute may include a parameter associated with a defect detection algorithm. For instance, a defect detection algorithm such as, but not limited to, an MDAT technique may be utilized to determine whether a defect is present (or a potential defect is present) at a given location based on the sample radiation 128 at that location. Accordingly, the signal attributes may include parameters associated with the defect detection algorithm such as, but not limited to, spotlikeness or an MDAT offset value.

A context attribute may include contextual information associated with an identified defect or potential defect. For example, a context attribute may include information associated with a relationship between a defect and surrounding areas such as, but not limited to, a relative brightness of a defect with respect to surrounding areas (e.g., polarity), relative or absolute location of the defect on the sample, proximity of the defect to features or areas of interest, brightness of a reference image used to detect the defect, or roughness associated with a reference image used to detect the defect. Context attributes may further include parameters associated with a defect detection algorithm such as, but not limited to, an MDAT gray level or an MDAT noise level.

In another embodiment, the method 200 includes a step 204 of labeling at least some of the inspection datasets with a class label based on position in a signal space defined by the two or more signal attributes, where each class label corresponds to a region of the signal space.

A signal space may be defined based on two or more signal attributes associated with the inspection data. In this regard, each inspection dataset associated with a defect may be mapped to a point in the signal space. In one embodiment, each inspection dataset associated with a defect is labeled with a class label based on where in the signal space the inspection dataset lies.

Figure 3:
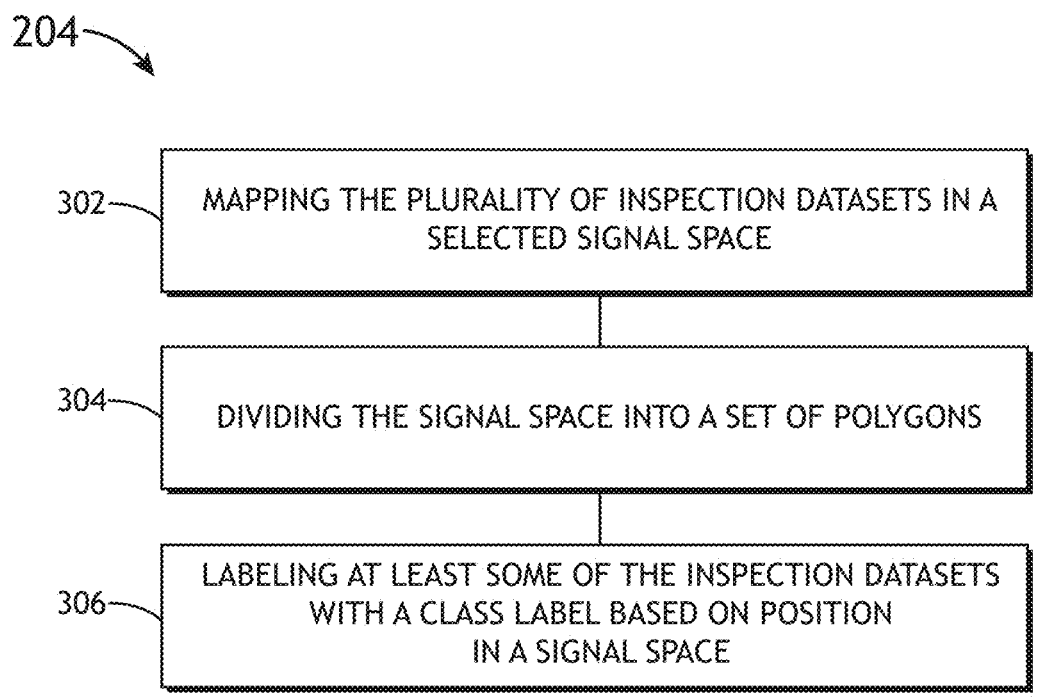
FIG. 3 is a flow diagram illustrating sub-steps associated with labeling each of the inspection datasets with a class label based on respective positions of each of the inspection datasets in a signal space, in accordance with one or more embodiments of the present disclosure.

FIG. 3 is a flow diagram illustrating sub-steps associated with labeling each of the inspection datasets with a class label based on respective positions of each of the inspection datasets in the signal space (e.g., associated with step 204), in accordance with one or more embodiments of the present disclosure.

In one embodiment, the step 204 may include a sub-step 302 of mapping the plurality of inspection datasets in a selected signal space.

Figure 4A:
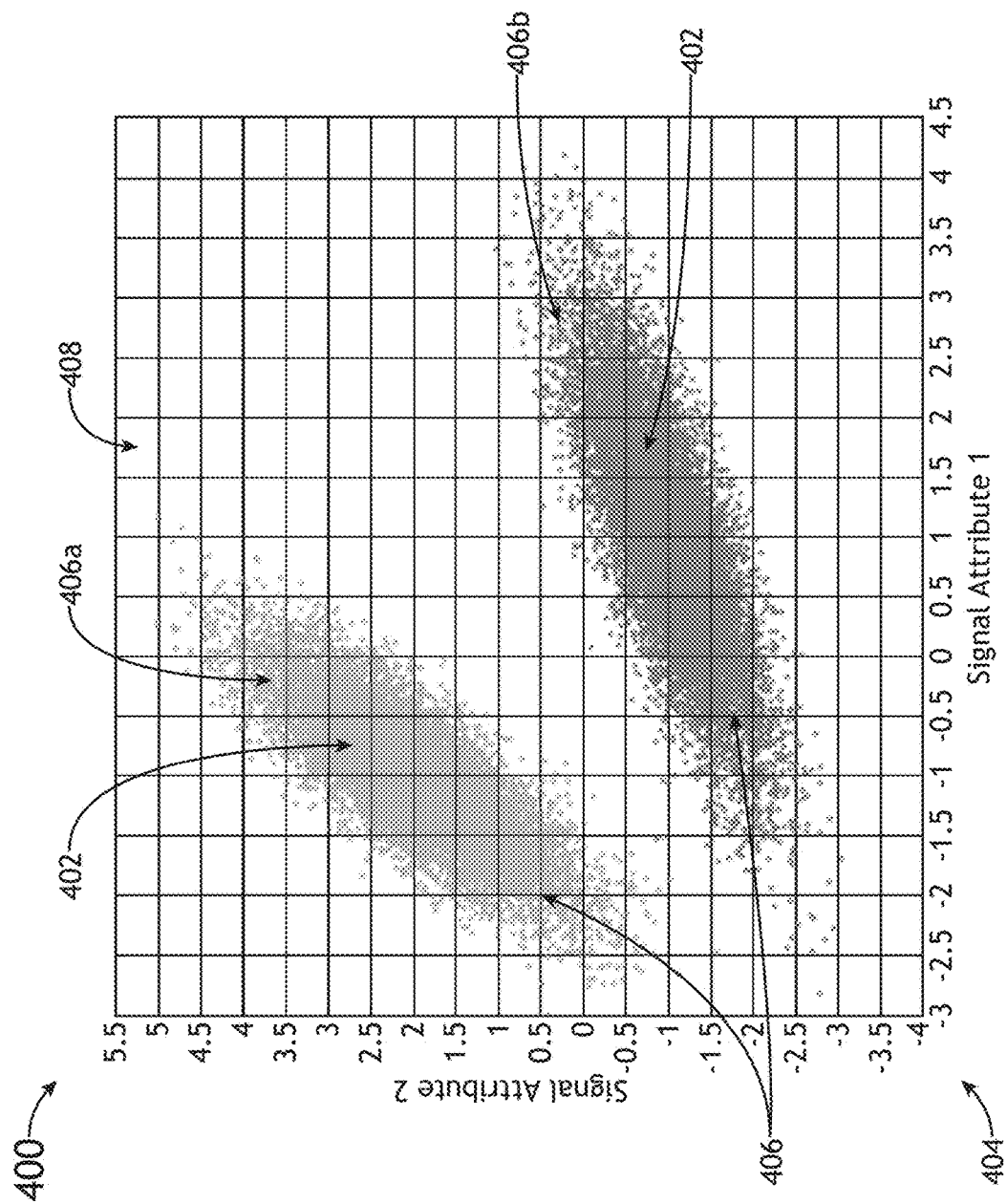
FIG. 4A is a plot of inspection data associated with a plurality of defects mapped into a two-dimensional signal space based on two signal attributes, in accordance with one or more embodiments of the present disclosure.

FIG. 4A is a plot 400 of inspection data 402 associated with a plurality of defects (e.g., generated by the inspection system 100, or the like) mapped into a two-dimensional signal space 404 based on two signal attributes (Signal Attribute 1 and Signal Attribute 2), in accordance with one or more embodiments of the present disclosure. It is to be understood that the mapping of inspection data 402 in a two-dimensional signal space illustrated in FIG. 4A is provided solely for illustrative purposes and should not be interpreted as limiting. In a general sense, inspection data 402 may be mapped into a multi-dimensional space of any number of dimensions based on any number of selected signal attributes.

Further, as illustrated in FIG. 4A, the inspection data 402 may be, but is not required to be, clustered into one or more signal clouds 406 in the signal space 404. For example, the inspection data 402 in FIG. 4A is grouped into at least a first signal cloud 406a and a second signal cloud 406b. Such signal clouds 406 may correspond, but are not required to correspond, to different defect groups. However, as described previously herein but not shown, defect segmentation based solely on signal clouds 406 in signal space (e.g., by clustering algorithms, principal component analysis, or the like) may not be sufficient to identify defect groups of interest. For instance, different defect groups having different noise characteristics, impact on production, impact on performance, or the like may have overlapping signal clouds 406. However, defect segmentation as described herein may facilitate identification and separation of the defect groups of interest in the signal clouds 406 based on the context attributes.

In another embodiment, the step 204 may include a sub-step 304 of dividing the signal space into a set of polygons. In this regard, the inspection datasets may be distributed between at least two polygons. A signal space 404 may be divided into polygons using any method known in the art such as, but not limited to, division into a multi-dimensional grid, Delaunay triangulation, or tessellation. Further, the sub-step 304 may include, but is not required to include, dividing the signal space 404 into a set of non-overlapping polygons, where each polygon represents a unique region of the signal space 404.

A multi-dimensional signal space 404 may generally be divided into polygons of any shape. For example, the two-dimensional signal space 404 illustrated in FIG. 4 may be divided into a grid of polygons 408 (here, rectangles). By way of another example, though not shown, the two-dimensional signal space 404 illustrated in FIG. 4A may be divided into polygons 408 of any shape including, but not limited to, triangles, pentagons, hexagons, or the like. Further, the two-dimensional signal space 404 illustrated in FIG. 4A may be divided into polygons 408 having different shapes and/or sizes. It is to be understood that a signal space 404 having more than two dimensions (e.g., as defined by more than two signal attributes) may be similarly divided into polygons 408 of any shape or size suitable for representing the signal space 404.

In another embodiment, the step 204 may include a sub-step 306 of labeling each inspection dataset associated with a defect with a class label based on position in the signal space 404. For example, the step 204 may include labeling each inspection dataset associated with a defect with a class label corresponding to a polygon 408 containing the respective inspection dataset in the signal space 404.

Figure 4B:
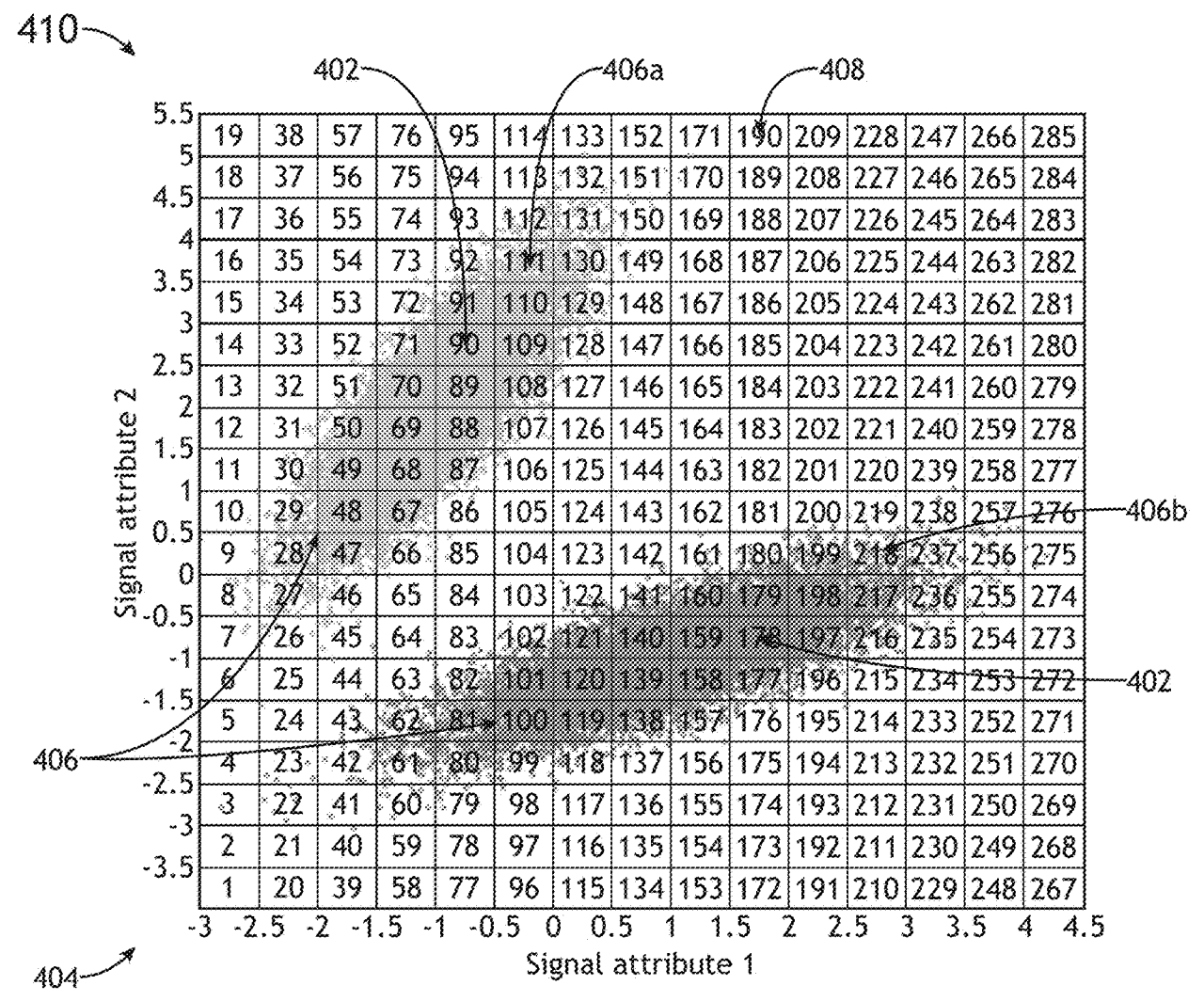

FIG. 4B is a plot 410 of the signal space 404 divided into a set of non-overlapping polygons 408 (here, rectangles), each with a different class label, in accordance with one or more embodiments of the present disclosure. For example, the polygons 408 of FIG. 4B are labeled with numerical identifiers ranging from 1 to 285. It is to be understood, however, that the use of numerals as class labels as well as the division of the signal space 404 illustrated in FIG. 4B is provided solely for illustrative purposes and should not be interpreted as limiting. For example, a set of class labels may include any one-dimensional set of labels or identifiers known in the art including, but not limited to, numerals, letters, or words. Further, it is not necessary to assign a class label to each polygon 408 associated with a signal space 404. In one embodiment, only polygons 408 including at least one inspection dataset associated with a defect is assigned a class label.

In another embodiment, the method 200 includes a step 206 of segmenting the inspection datasets into defect groups by training a classifier with the values of the context attributes and corresponding class labels, where the two or more defect groups are identified based on the trained classifier.

The step 206 may include training any type of classifier known in the art to identify different defect groups based on the context attributes and the class labels. For example, the step 206 may include training a supervised classifier (e.g., a supervised learning technique) to identify different defect groups based on the context attributes and the class labels. A supervised classifier may generally identify patterns between input parameters and class labels based on training data in order to predict a class label for new inputs based on input parameters associated with the new inputs. In one embodiment, the step 206 includes using the context attributes from inspection datasets associated with defects as inputs to the supervised classifier and the class labels associated with corresponding polygons in the signal space 404 as training data for the supervised classifier. Accordingly, training the supervised classifier may identify patterns between the context attributes and position in the signal space 404 (e.g., based on the polygons 408 associated with the class labels), which may be used to segment the inspection data into different defect groups. In this regard, a supervised classification technique may use the context attributes to identify defect groups that may have overlapping signal clouds 406 in the signal space 404 and/or different noise characteristics.

Figure 5A:
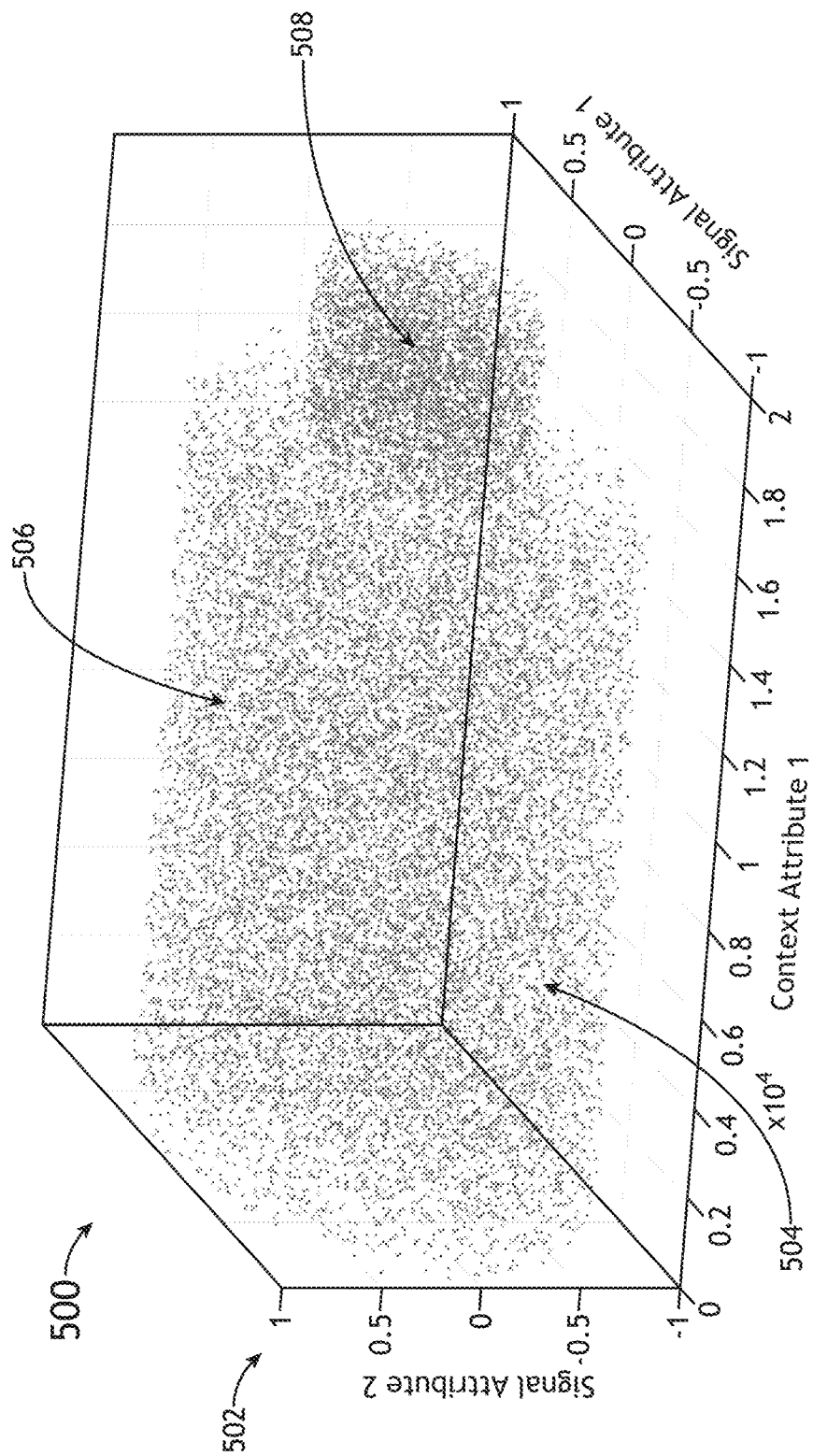
FIG. 5A is a plot illustrating inspection data including defect groups having overlapping signal clouds in a signal space that may be distinguished based on a context attribute, in accordance with one or more embodiments of the present disclosure.

FIG. 5A is a plot 500 illustrating inspection data including defect groups having overlapping signal clouds 406 in a signal space 502 that may be distinguished based on a Context Attribute, in accordance with one or more embodiments of the present disclosure. The plot 500 includes inspection data 504 mapped in a three-dimensional space including two signal attributes and one context attribute. As illustrated in plot 500, the inspection data 504 may be segmented into a first segment 506 having a Context Attribute value of less than or equal to 15,754.5 and a second segment 508 having a Context Attribute value greater than 15,754.5.

Figure 5B:
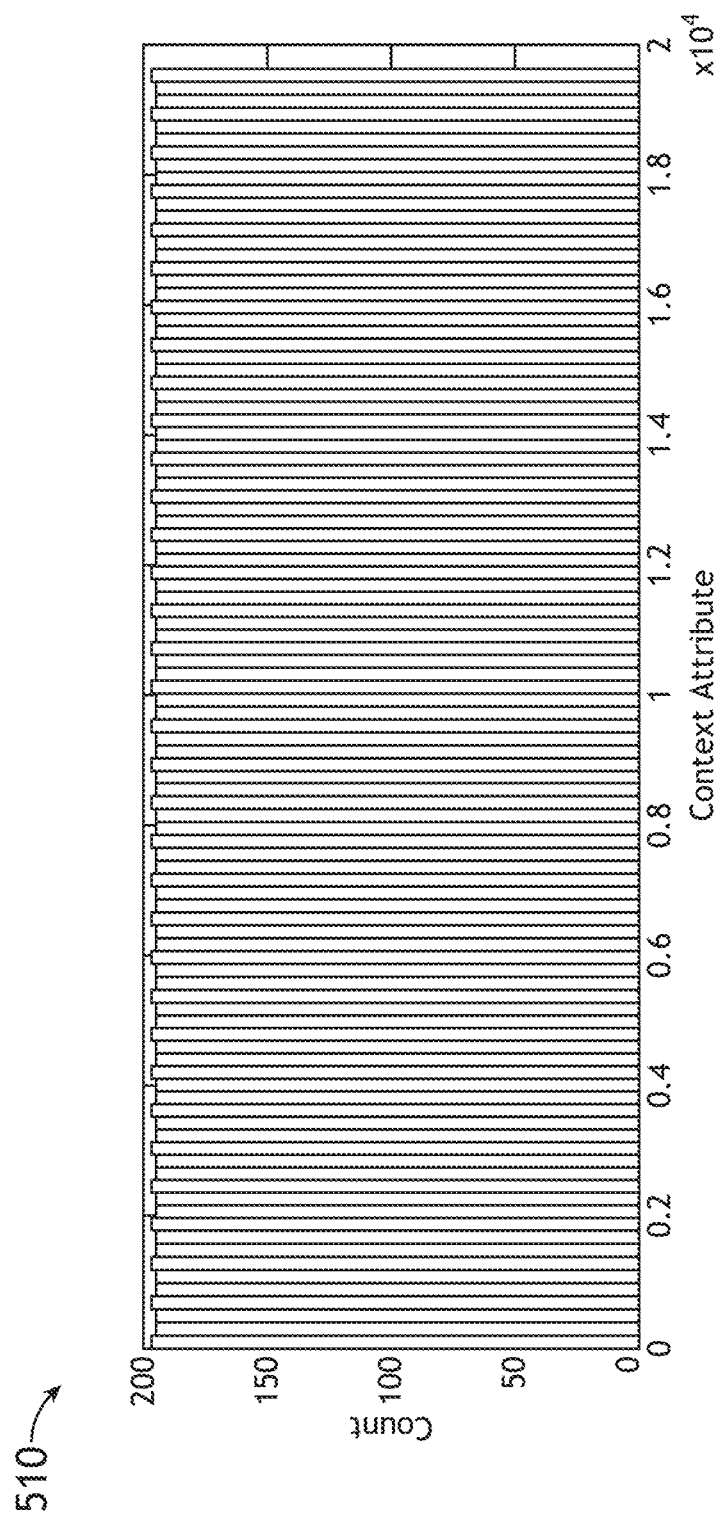
FIG. 5B is a histogram of the inspection data as a function of the context attribute in FIG. 5A, in accordance with one or more embodiments of the present disclosure.

However, the first segment 506 from the second segment 508 may not be distinguishable when segmenting solely on either the signal attributes or the context attribute. For example, when viewed entirely in the signal space 502 (e.g., by projecting the inspection data 504 onto a plane defined by Signal Attribute 1 and Signal Attribute 2 of FIG. 5A), the signal clouds 406 overlap such that the first segment 506 may not be distinguished from the second segment 508. By way of another example, when viewed entirely in the context domain (e.g., by projecting the inspection data 504 onto a plane defined by the Context Attribute and either of Signal Attribute 1 or Signal Attribute 2), the signal clouds 406 also overlap such that the first segment 506 may not be distinguished from the second segment 508. Further, FIG. 5B is a histogram 510 of the inspection data 504 as a function of the Context Attribute, in accordance with one or more embodiments of the present disclosure. As illustrated in FIG. 5B, the number of inspection datasets (e.g., the number of defects) within the inspection data 504 is evenly spread with the Context Attribute such that the first segment 506 is indistinguishable from the second segment 508.

However, training a supervised classifier with the Context Attribute and corresponding class labels associated with position in the signal space 502 defined by Signal Attribute 1 and Signal Attribute 2 in FIG. 5A may distinguish the first segment 506 from the second segment 508. For example, defects having a Context Attribute value of less than or equal to 15,754.5 may be mapped to locations in the signal space 502 defined by a circle centered at approximately 0 and having a radius of approximately 1, whereas defects having a Context Attribute value greater than 15,754.5 may be mapped to locations in the signal space 502 defined by a circle centered at approximately 0 and having a radius of approximately 0.5.

The step 206 may incorporate any supervised classifier known in the art to segment inspection data. For example, the step 206 may incorporate one or more machine-learning techniques including, but not limited to, a decision tree technique, nearest neighbor technique, a regression technique, a Bayesian technique, a support vector machine technique, a similarity technique, or a neural network technique. Accordingly, cut-lines associated with segmenting the inspection data into different defect groups may reflect a structure of the trained classifier. For example, training a decision tree classifier may generate a decision tree with cut-points associated with values of a context attribute that define branches of the tree. Further, the resulting decision tree may define ranges of the various context attributes that result in a common class label or group of class labels with a certain probability. Accordingly, the step 206 may include segmenting the inspection data into different defect groups based on the ranges of the context attributes associated with the decision tree. Further, the defect groups identified by the decision tree may correspond to different, potentially overlapping, signal clouds in the signal space.

Figure 6:
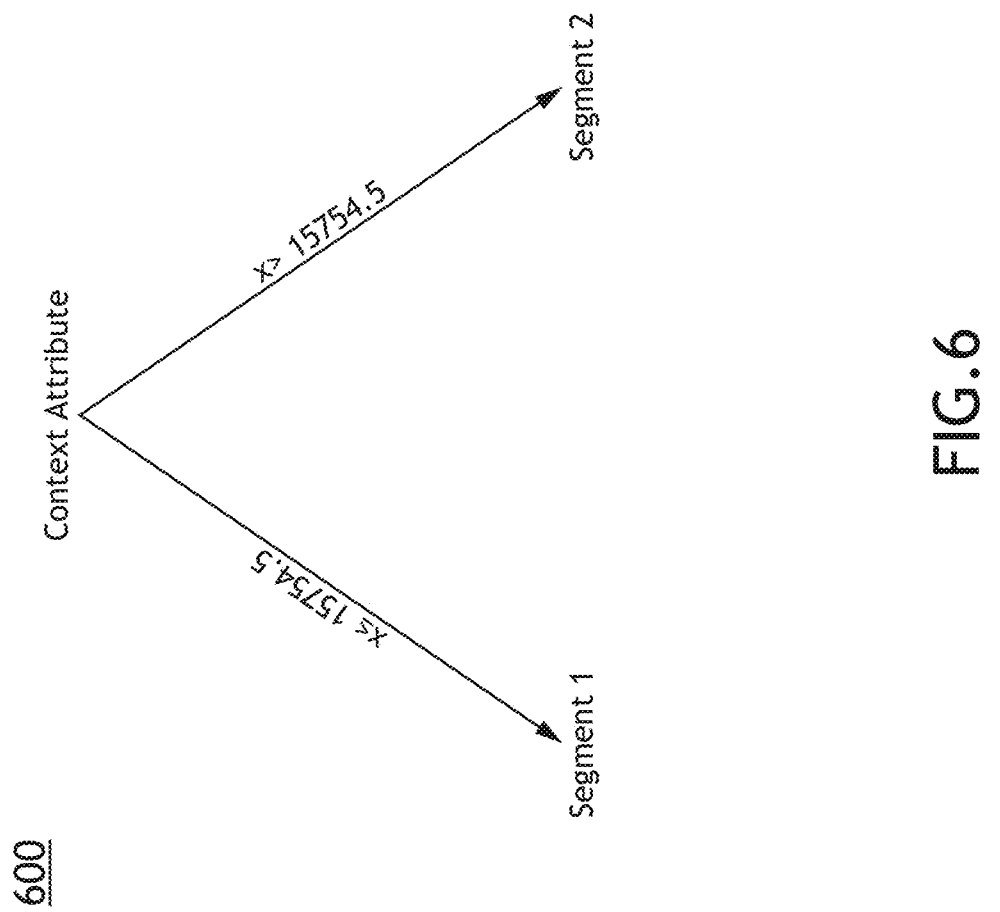
FIG. 6 is a decision tree generated by training a decision tree classifier with the context attribute information of the inspection data in FIG. 5A and corresponding class labels associated with non-overlapping regions of a signal space, in accordance with one or more embodiments of the present disclosure.

FIG. 6 is a decision tree 600 generated by training a decision tree classifier with the Context Attribute information of the inspection data 504 and corresponding class labels associated with non-overlapping regions of the signal space 502, in accordance with one or more embodiments of the present disclosure. As illustrated in FIG. 6, a single cut-point associated with a Context Attribute value of 15,754.5 is identified. Accordingly, defects having a Context Attribute value of less than or equal to 15,754.5 are segmented into the first segment 506 and defects having a Context Attribute value of greater than 15,754.5 are segmented into the second segment 508 such that the first segment 506 may be accurately and efficiently distinguished from the second segment 508.

It is to be understood that FIGS. 5A through 6 and the associated descriptions are provided solely for illustrative purposes and should not be interpreted as limiting. For example, as described previously herein, an inspection dataset may generally include any number of signal attributes and context attributes. Accordingly, the particular example of two signal attributes and one context attribute is solely illustrative. By way of another example, it may be the case that segments defined by a trained classifier do not incorporate each context attribute. In this regard, the excluded context attributes may not be necessary to define the defect groups. FIG. 7 is a decision tree 700 associated with inspection data including 11 context attributes, only 6 of which (Reference Roughness, Reference Brightness, MDAT Noise, Radial Position (PosRadius), Test Roughness, and Test Brightness) are used to segment the inspection data, in accordance with one or more embodiments of the present disclosure. Based on the decision tree 700, 14 defect groups are identified with varying ranges of the context attributes.

Further, the structure of a trained classifier may vary based on the type of classifier. Accordingly, the decision trees illustrated in FIGS. 6 and 7 are provided solely for illustrative purposes and should not be interpreted as limiting. However, it is recognized herein that the supervised learning technique should segment the inspection data into groups based on identified ranges of at least some of the context attributes.

The method 200 may further include utilizing the segmentation information as feedback or feedforward data for any process step including, but not limited to, defect discovery, defect classification, nuisance filtering, recipe control, or optics selection. For example, segmentation information on samples within a lot may be provided as feedback data for process steps on additional samples within the lot or additional lots. By way of a further example, segmentation information on samples within a lot may be provided as feedforward data for subsequent process steps associated with the same samples in the lot.

In one embodiment, segmentation information may be used to facilitate discovery of new defects. For example, defect segmentation based on signal and context attributes as described herein may enable the detection of certain defects of interest that may otherwise be buried within the signal clouds of other defects and may provide a significant improvement over traditional segmentation techniques.

In one embodiment, segmentation information may be used to facilitate defect classification into any type of classification group such as, but not limited to, physical structure of defect, likelihood of impact on performance, or likelihood of failure. For example, defect segmentation based on signal and context attributes as described herein may enable the classification of defects based on the noise characteristics of defects in a group (e.g., associated with the size of the signal cloud).

In another embodiment, segmentation information may be used to facilitate optics selection. For example, it may be desirable to select and configure optics in inspection systems based on a separation between a selected defect of interest and other defects identified in a given optics mode. In some embodiments, receiver operating characteristic (ROC) curves generated based on segmentation information generated using signal and context attributes as described herein may facilitate selection of optics for efficient and sensitive inspection.

In another embodiment, inspection data including defect segmentation information on one or more samples may be utilized to generate an inspection recipe (e.g., including definitions of inspection locations, setup parameters for inspection, or the like) for one or more additional samples.

In another embodiment, segmentation information may be used to facilitate nuisance filtering. For example, after selecting an optics mode, a nuisance filter may be included in an inspection recipe to distinguish and isolate selected defects of interest from additional identified defects on a sample.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An inspection system comprising:
a controller including one or more processors configured to execute program instructions configured to cause the one or more processors to:
receive a plurality of inspection datasets from a defect inspection system associated with inspection of one or more samples, wherein an inspection dataset of the plurality of inspection datasets associated with a defect includes values of two or more signal attributes and values of one or more context attributes, wherein a signal attribute of the two or more signal attributes is representative of a signal generated by the defect inspection system in response to a defect, wherein a context attribute of the one or more context attributes is representative of one or more additional characteristics of the defect;
label each of the inspection datasets with a class label from a set of class labels based on respective positions of each of the inspection datasets in a signal space defined by the two or more signal attributes, wherein each class label corresponds to a region of the signal space, wherein the one or more processors label each of the inspection datasets with a class label by: mapping the plurality of inspection datasets in the signal space; dividing the signal space into a set of polygons, wherein the inspection datasets are distributed between at least two polygons of the set of polygons; and labeling each inspection dataset of the plurality of inspection datasets with a class label from the set of class labels corresponding to a polygon from the set of polygons containing the respective inspection dataset; and
segment the plurality of inspection datasets into two or more defect groups by training a classifier with the values of the one or more context attributes and corresponding class labels from the set of class labels for the plurality of inspection datasets, wherein the two or more defect groups are identified based on the trained classifier.

2. The inspection system of claim 1, wherein training the classifier with the values of the one or more context attributes and corresponding class labels from the set of class labels for the plurality of inspection datasets comprises:
training the classifier with the values of the one or more context attributes and corresponding class labels from the set of class labels for the plurality of inspection datasets using a supervised learning technique, wherein identifying the two or more defect groups from the trained classifier comprises:
identifying the two or more defect groups based on at least one of a learned function or a structure of the trained classifier.

3. The inspection system of claim 2, wherein the supervised learning technique comprises:
a machine learning technique.

4. The inspection system of claim 2, wherein the supervised learning technique comprises:
at least one of a decision tree technique, nearest neighbor technique, a regression technique, a Bayesian technique, a support vector machine technique, a similarity technique, or a neural network technique.

5. The inspection system of claim 1, wherein the set of class labels correspond to nonoverlapping regions of the signal space.

6. The inspection system of claim 1, wherein the set of class labels comprises:
a one-dimensional representation of the signal space defined by the two or more signal attributes.

7. The inspection system of claim 1, wherein labeling each of the inspection datasets with a class label from the set of class labels based on respective positions of each of the inspection datasets in a signal space defined by the two or more signal attributes comprises:
generating the set of class labels corresponding to non-overlapping regions of a multi-dimensional signal space defined by the two or more signal attributes.

8. The inspection system of claim 1, wherein dividing the signal space into a set of polygons comprises:
dividing the signal space into the set of polygons by dividing the signal space into a regular multi-dimensional grid.

9. The inspection system of claim 1, wherein dividing the signal space into a set of polygons comprises:
dividing the signal space into the set of polygons using at least one of Delaunay triangulation or tessellation.

10. The inspection system of claim 1, wherein the two or more defect groups correspond to one or more contiguous groups of polygons in the set of polygons associated with the signal space defined by the two or more signal attributes.

11. The inspection system of claim 9, wherein the one or more processors are further configured to execute program instructions causing the one or more processors to:
extract ranges of the two or more signal attributes associated with at least some of the two or more defect groups.

12. The inspection system of claim 1, wherein the one or more processors are further configured to execute program instructions causing the one or more processors to:
classify one or more defects based on the two or more defect groups.

13. The inspection system of claim 1, wherein the one or more processors are further configured to execute program instructions causing the one or more processors to:
generate an inspection recipe based on at least one of two or more defect groups.

14. The inspection system of claim 13, wherein the defect inspection recipe provides detection of selected defects of interest.

15. The inspection system of claim 13, wherein the defect inspection recipe provides nuisance filtering.

16. The inspection system of claim 1, wherein the one or more processors are further configured to execute program instructions causing the one or more processors to:
select an optics mode based on the two or more defect groups.

17. The inspection system of claim 16, wherein selecting the optics mode based on the two or more defect groups comprises:

ranking two or more optics modes based on one or more separation distances of one or more selected defects of interest from additional defects; and selecting the optics mode to maximize the one or more separation distances.

18. An inspection system comprising:

a defect inspection system comprising;

an illumination source configured to generate one or more illumination beams; and a detector configured to capture radiation emanating from a sample in response to the one or more illumination beams; and a controller communicatively coupled to the detector, the controller including one or more processors configured to execute program instructions configured to cause the one or more processors to:

receive a plurality of inspection datasets from a defect inspection system associated with inspection of one or more samples, wherein an inspection dataset of the plurality of inspection datasets associated with a defect includes values of two or more signal attributes and values of one or more context attributes, wherein a signal attribute of the two or more signal attributes is representative of a signal generated by the defect inspection system in response to a defect, wherein a context attribute of the one or more context attributes is representative of one or more additional characteristics of the defect;

label each of the inspection datasets with a class label from a set of class labels based on respective positions of each of the inspection datasets in a signal space defined by the two or more signal attributes, wherein each class label corresponds to a region of the signal space, wherein the one or more processors label each of the inspection datasets with a class label by: mapping the plurality of inspection datasets in the signal space; dividing the signal space into a set of polygons, wherein the inspection datasets are distributed between at least two polygons of the set of polygons; and labeling each inspection dataset of the plurality of inspection datasets with a class label from the set of class labels corresponding to a polygon from the set of polygons containing the respective inspection dataset; and segment the plurality of inspection datasets into two or more defect groups by training a classifier with the values of the one or more context attributes and corresponding class labels from the set of class labels for the plurality of inspection datasets, wherein the two or more defect groups are identified based on the trained classifier.

19. The inspection system of claim 18, wherein the illumination source comprises:

an optical illumination source.

20. The inspection system of claim 19, wherein the illumination source comprises:

a broadband plasma illumination source.

21. The inspection system of claim 19, wherein wavelengths of the one or more illumination beams comprise:

at least one of extreme ultraviolet wavelengths, vacuum ultraviolet wavelengths, deep ultraviolet wavelengths, or ultraviolet wavelengths.

22. The inspection system of claim 18, wherein the illumination source comprises:

a particle-beam illumination source.

23. The inspection system of claim 22, wherein the illumination source comprises:

an electron-beam illumination source.

24. The inspection system of claim 18, wherein training the classifier with the values of the one or more context attributes and corresponding class labels from the set of class labels for the plurality of inspection datasets comprises:

training the classifier with the values of the one or more context attributes and corresponding class labels from the set of class labels for the plurality of inspection datasets using a supervised learning technique, wherein identifying the two or more defect groups from the trained classifier comprises:

identifying the two or more defect groups based on at least one of a learned function or a structure of the trained classifier.

25. The inspection system of claim 24, wherein the supervised learning technique comprises:

a machine learning technique.

26. The inspection system of claim 24, wherein the supervised learning technique comprises:

at least one of a decision tree technique, nearest neighbor technique, a regression technique, a Bayesian technique, a support vector machine technique, a similarity technique, or a neural network technique.

27. The inspection system of claim 18, wherein the set of class labels correspond to nonoverlapping regions of the signal space.

28. The inspection system of claim 18, wherein labeling each of the inspection datasets with a class label from the set of class labels based on respective positions of each of the inspection datasets in a signal space defined by the two or more signal attributes comprises:

generating the set of class labels corresponding to non-overlapping regions of a multi-dimensional signal space defined by the two or more signal attributes.

29. The inspection system of claim 18, wherein dividing the signal space into a set of polygons comprises:

dividing the signal space into the set of polygons by dividing the signal space using at least one of a multi-dimensional grid, Delaunay triangulation or tessellation.

30. The inspection system of claim 18, wherein the one or more processors are further configured to execute program instructions causing the one or more processors to:

extract ranges of the two or more signal attributes associated with at least some of the two or more defect groups.

31. The inspection system of claim 18, wherein the one or more processors are further configured to execute program instructions causing the one or more processors to:

classify one or more defects based on the two or more defect groups.

32. The inspection system of claim 18, wherein the one or more processors are further configured to execute program instructions causing the one or more processors to:

generate an inspection recipe based on at least one of two or more defect groups.

33. The inspection system of claim 32, wherein the defect inspection recipe provides nuisance filtering.

34. The inspection system of claim 18, wherein the one or more processors are further configured to execute program instructions causing the one or more processors to:

select an optics mode based on the two or more defect groups.

35. A method for segmenting metrology defects comprising:
- receiving a plurality of inspection datasets from a defect inspection system associated with inspection of one or more samples, wherein an inspection dataset of the plurality of inspection datasets associated with a defect includes values of two or more signal attributes and values of one or more context attributes, wherein a signal attribute of the two or more signal attributes is representative of a signal generated by the defect inspection system in response to a defect, wherein a context attribute of the one or more context attributes is representative of one or more additional characteristics of the defect;
- labeling each of the inspection datasets with a class label from a set of class labels based on respective positions of each of the inspection datasets in a signal space defined by the two or more signal attributes, wherein each class label corresponds to a region of the signal space, wherein the labeling each of the inspection datasets with a class label comprises mapping the plurality of inspection datasets in the signal space; dividing the signal space into a set of polygons, wherein the inspection datasets are distributed between at least two polygons of the set of polygons; and labeling each inspection dataset of the plurality of inspection datasets with a class label from the set of class labels corresponding to a polygon from the set of polygons containing the respective inspection dataset; and
- segmenting the plurality of inspection datasets into two or more defect groups by training a classifier with the values of the one or more context attributes and corresponding class labels from the set of class labels for the plurality of inspection datasets, wherein the two or more defect groups are identified based on the trained classifier.

36. An inspection system comprising:
- a controller including one or more processors configured to execute program instructions configured to cause the one or more processors to:
- receive a plurality of inspection datasets from a defect inspection system associated with inspection of one or more samples, wherein an inspection dataset of the plurality of inspection datasets associated with a defect includes values of two or more signal attributes and values of one or more context attributes, wherein a signal attribute of the two or more signal attributes is representative of a signal generated by the defect inspection system in response to a defect, wherein a context attribute of the one or more context attributes is representative of one or more additional characteristics of the defect;
- label each of the inspection datasets with a class label from a set of class labels based on respective positions of each of the inspection datasets in a signal space defined by the two or more signal attributes, wherein each class label corresponds to a region of the signal space;
- segment the plurality of inspection datasets into two or more defect groups by training a classifier with the values of the one or more context attributes and corresponding class labels from the set of class labels for the plurality of inspection datasets, wherein the two or more defect groups are identified based on the trained classifier; and
- select an optics mode based on the two or more defect groups by ranking two or more optics modes based on one or more separation distances of one or more selected defects of interest from one or more additional defects; and selecting the optics mode to maximize the one or more separation distances.

\* \* \* \* \*